Figure 1:
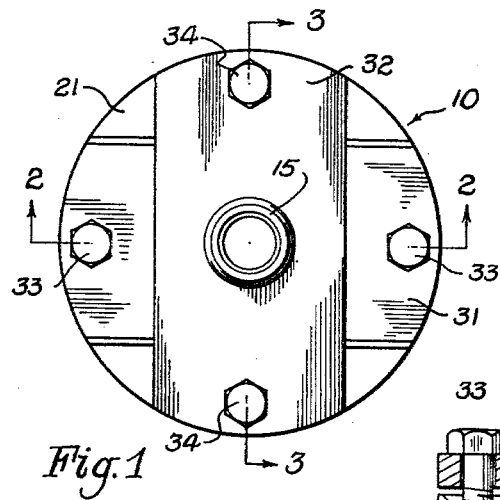

April 6, 1965    L. A. GUILDNER ETAL    3,177,017
BALL AND SOCKET PIPE JOINT
Filed May 23, 1963    2 Sheets-Sheet 1

INVENTORS
Leslie A. Guildner
Harold F. Stimson
BY Alvin J. Englert
AGENT

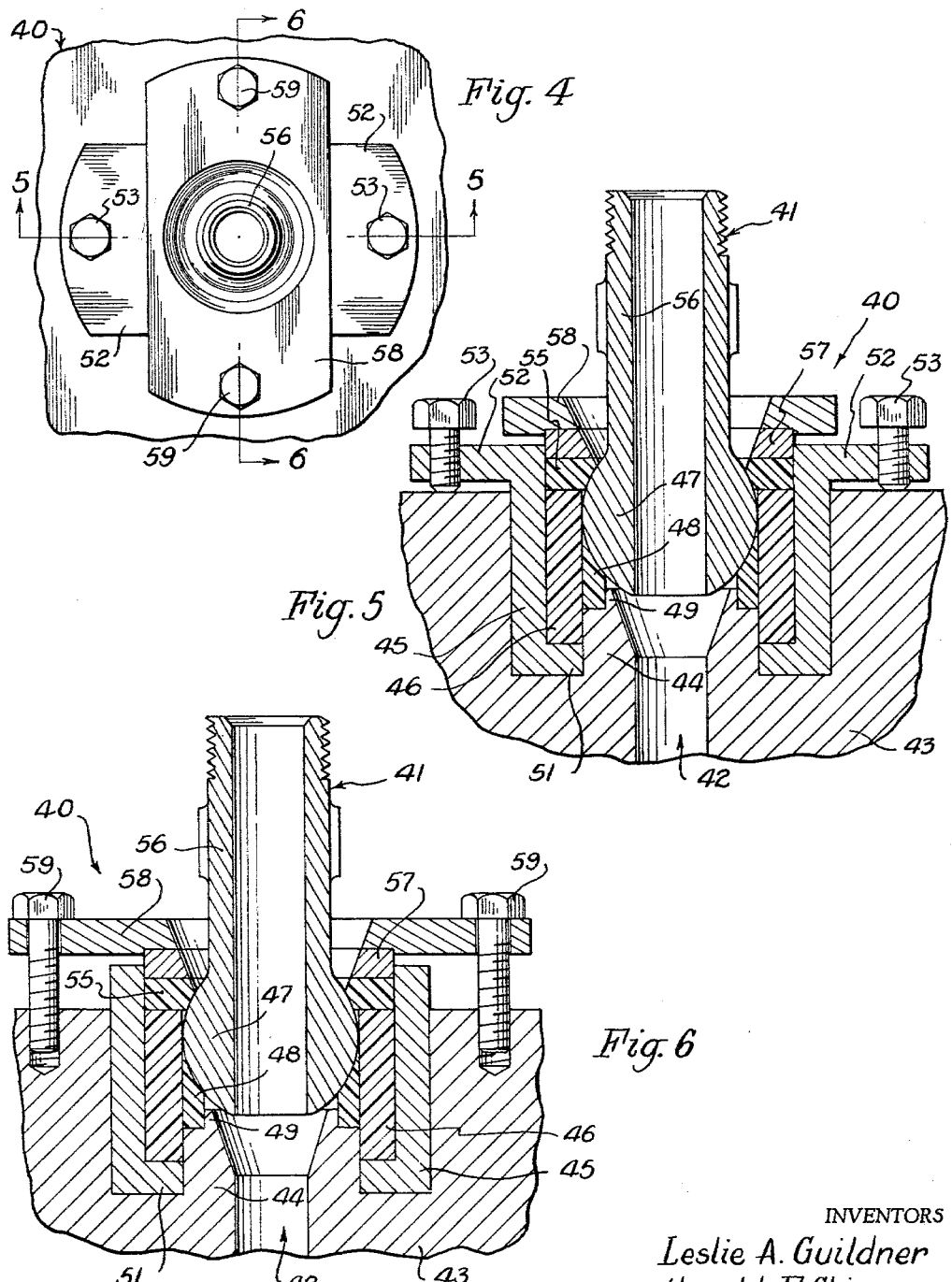

3,177,017
BALL AND SOCKET PIPE JOINT
Leslie A. Guildner, Bethesda, Md., and Harold F. Stimson, Washington, D.C., assignors to the United States of America as represented by the Secretary of Commerce
Filed May 23, 1963, Ser. No. 282,819
2 Claims. (Cl. 285—270)

This invention relates to a ball and socket pipe joint, and more particularly to a ball and socket pipe joint having externally-located, adjustable spring means for tightening the bearings and packing thereof.

In the ball and socket pipe joints of the prior art, the socket consists of a tubular casing that is open at one end and which terminates in a conduit at the other end. The ball is fitted into the open end of the casing, with bearings arranged on the ends of the ball and a packing sleeve on the mid-portion of the ball. To maintain the bearings and packing sleeve in firm engagement with the ball, springs are disposed in the casing near the conduit and so arranged as to tend to expel the ball and packing out of the socket. A cover plate is fastened to the open end of the casing to resist the expulsion tendency and thereby complete the joint. Because the springs are disposed in the casing between the ball and conduit, the springs are subjected to the fluid carried by the joint. This arrangement is disadvantageous, for if the fluid is corrosive, the springs tend to be deteriorated; and if the joint is used in a vacuum line, the springs tend to contaminate the vacuum system. The arrangement is also disadvantageous from the standpoint that the springs cannot readily be adjusted to compensate for wear in the bearings and packing sleeve.

The disadvantages of the prior ball and socket joints are obviated in the present invention, wherein the necessary spring members for tightening the bearings and packing are located outside of the socket. Briefly, in a joint constructed in accordance with the principles of the present invention, the conduit for connection with the ball is not terminated in the end of the socket casing as in the prior art, but rather extends into the casing to terminate adjacent the ball therein. A bearing is disposed between the confronting portions of the conduit and ball, and a packing sleeve is fitted into the casing around the conduit, bearing and ball so as to seal the ball to the conduit. The end of the ball opposite the conduit is provided with another bearing which is arranged with the conduit to be urged by spring means connected to the ends of the casing so as to firmly engage the ball in the bearings. Additional urging means are connected to the ends of the casing to tighten the packing sleeve disposed therein. By this arrangement, the urging means are not subjected to the fluid transferred between the ball and conduit, and the urging means may be readily adjusted, without disassembling the joint, to compensate for wear in the bearings and packing sleeve.

Accordingly, it is an object of the present invention to provide a ball and socket pipe joint in which the bearing and packing tightening means are durable, do not contaminate the fluid transferred through the joint, and are readily adjustable without disassembling the joint.

Another object of this invention is to provide a ball and socket joint in which the ball and associated conduit are disposed as close to each other as possible.

Another object is to provide a ball and socket joint which is economical to manufacture, easily assembled, and rugged, compact and reliable in operation.

A further object is to provide a ball and socket joint which can be utilized to transfer a variety of fluids under a wide range of pressures from sub-atmospheric to supra-atmospheric and under a wide range of temperatures.

Still another object is to provide a ball and socket joint in which the frictional drag on the ball is readily adjustable to a minimum for any operating condition.

Figure 2:
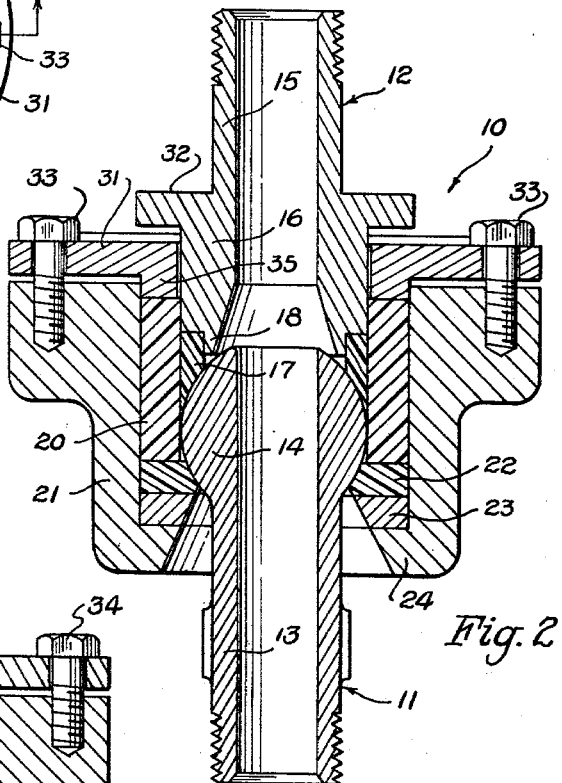
Figure 3:
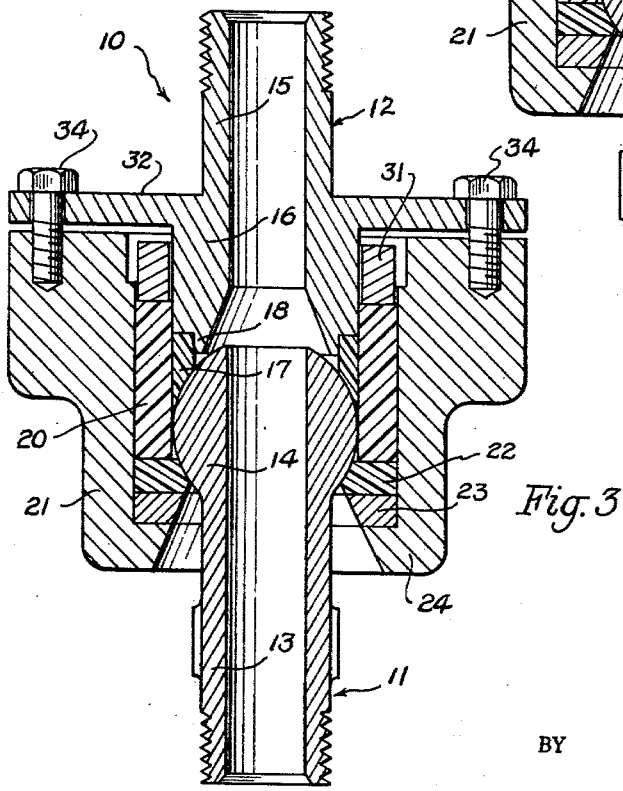

These and other objects and advantages and features of the present invention will readily become apparent as the following description is read in conjunction with the accompanying drawings, wherein:

FIG. 1 is a plan view of a ball and socket pipe joint constructed according to the present invention;

FIGS. 2 and 3 are enlarged axial sectional views taken on the lines 2—2 and 3—3, respectively, of FIG. 1;

FIG. 4 is a plan view of another ball and socket pipe joint embodying the principles of the present invention; and FIGS. 5 and 6 are enlarged axial sectional views taken on the lines 5—5 and 6—6, respectively, of FIG. 4.

In the ball and socket pipe joint 10 illustrated in FIGS. 1–3, the reference numerals 11 and 12 designate a ball member and a conduit member, respectively, which are disposed in end-to-end relationship and which are to be flexibly joined together. The ball member 11 has a shank 13 and a ball 14, while the conduit member 12 correspondingly has a shank 15 and a cylinder 16. The outside diameters of the ball 14 and cylinder 16 preferably are substantially equal. A bearing 17 for the ball 14, which bearing 17 also has an outside diameter substantially equal to the outside diameter of the ball 14, is disposed between the confronting portions of the ball 14 and cylinder 16, the bearing 17 being centered and radially-supported on the cylinder 16 by means of a lip 18. Consequently, there is a uniform, cylindrical outer surface between the ball 14 and cylinder 16.

Around this cylindrical outer surface between the ball 14 and cylinder 16 there is fitted a packing sleeve 20, which in turn is fitted into the substantially cylindrical internal bore of a casing 21. As will readily be appreciated, tightening of this packing sleeve 20 axially of the casing 21 causes the packing sleeve 20 to seal between the ball 14 and the bore of casing 21, and also between the cylinder 16 and the bore of casing 21, thereby effecting a fluid-tight seal between the ball member 11 and conduit member 12.

To enable the packing sleeve 20 to be tightened, and also to retain the ball 14 in engagement with the bearing 17, a second bearing 22 is fitted into the bore of the casing 21. This bearing 22 engages the end of the ball 14 near the shank 13, and is restrained from moving out of the casing 21 by means of a ring 23 that abuts an inwardly-projecting circular flange 24 formed at the end of the casing 21. The opening through the circular flange 24 is slightly greater than the outside diameter of the ball 14, and the ring 23 and bearing 22 are each split in half along a diameter to enable the ball 14 to be inserted through the flange 24 during assembly. If desired, the flange 24 may be suitably arranged to abut bearing 22 directly, thereby eliminating the ring 23 and requiring that the ball member 11 be fitted into the casing 21 by inserting shank 13 through the rearranged flange.

At the end of the casing 21 opposite the circular flange 24, there is provided a pair of criss-crossed leaf springs 31, 32 each having their ends adjustably secured to the casing 21 by means of screw pairs 33, 34, respectively. The inner leaf spring 31 has a central opening through which the cylinder 16 of conduit member 12 extends. Around this central opening there is a raised collar 35 which bears against the end of the packing sleeve 20. Consequently, as the screws 33 are threaded into the casing 21, the leaf spring 31 axially forces the packing sleeve 20 towards the immovable bearing 22, thereby causing the packing sleeve 20 to seal around the mid-portion of ball 14 and around the end portion of cylinder 16.

The outer leaf spring 32 is attached to the conduit member 12 and consequently urges the cylinder 16 into the casing 21 as the screws 34 are threaded into the casing 21. As a result, the bearing 17 disposed between the cylinder 16 and ball 14 is urged towards the immovable bearing 22, causing the ball 14 to be firmly seated in these bearings 17, 22.

From the foregoing, it will be seen that the springs 31, 32 for tightening the packing sleeve 20 and bearings 17, 22 are disposed externally of the casing 21. This arrangement enables the spring forces to be readily and quickly adjusted, without disassembling the joint, to compensate for wear in the packing sleeve and the bearings. Moreover, the spring forces may readily be adjusted to the minimum values necessary to maintain a sealed and seated ball joint under any operating condition encountered, thereby enabling one to achieve the minimum frictional drag on the ball for the situation at hand. Furthermore, in the present arrangement, the fluid path between the ball and conduit members 11, 12 is bounded by the packing sleeve 20 and bearing 17, which elements may be constructed of inert materials to permit the joint to transfer corrosive fluids, or to be connected into a hard-vacuum line. For example, a preferred material for constructing the packing sleeve 20 is Teflon, which is inert and self-lubricating. The bearings 17, 22 preferably are constructed from a durable, inert synthetic resin that is less extrudable than the material of the sleeve 20, an example of such resin being Kel-F. Since the fluid path is bounded by the packing sleeve 20 and bearing 17, the casing 21 and springs 31, 32 are not subjected to any corrosive fluids transferred through the joint, thereby extending the lifetime and reliability of the joint.

To assemble the joint 10 of FIGS. 1–3, the ball member 11 is inserted into the casing 21 in either of two ways. If the split ring 23 described above is employed, the ball 14 may be inserted through the flange 24 and casing 21, after which the split ring 23 and split bearing 22 are slipped into place near the flange 24. Thus, the threaded end of the ball member 11 may, if desired, be connected to a length of line during assembly of the joint. However, if the threaded end of ball member 11 is not connected to a further line, or if the split ring 23 is replaced by a flange having an opening smaller than the diameter of ball 14, the bearing 22 is fitted into the casing 21, and the shank 13 is then inserted into the casing and through the flange. With the ball member 11 in place by use of either of these procedures, the packing sleeve 20, bearing 17 and leaf spring 31 are arranged in the casing 21, after which the cylinder 16 of the conduit member 12 is inserted through the central opening in the leaf spring 31 and through the packing sleeve 20, so as to engage the bearing 17 in the lip 18. The screws 34 are then evenly tightened to snugly seat the ball 14, after which the screws 33 are evenly tightened an amount sufficient to prevent any leak in the joint for the intended fluid pressure.

In the further embodiment of the invention illustrated in FIGS. 4–6, the ball and socket pipe joint 40 has a ball member 41 that is disposed in end-to-end relationship with a conduit member 42 formed in a body 43 comprising part of a piece of equipment, apparatus, or the like. The conduit member 42 is provided with a cylinder 44 that projects a short distance into a cylindrical cavity formed in the body 43, which cavity receives a casing 45 that surrounds a packing sleeve 46 which in turn surrounds the ball 47, the cylinder 44, and a bearing 48 disposed between the confronting portions of the ball 47 and cylinder 44. To center and radially support the bearing 48 on the cylinder 44, a lip 49 is provided on the end of the cylinder.

The end of the casing 45 adjacent the bottom of the cavity in the body 43 has an inwardly-projecting circular flange 51 against which the packing sleeve 46 abuts, while the other end of the casing 45 has a pair of outwardly-projecting arms 52 forming a leaf spring that slightly clears the body 43. A pair of screws 53 are threaded through the ends of the arms 52 and bear against the body 43, whereby the casing 45 and packing sleeve 46 are urged out of the cavity as the screws 53 are threaded into the arms 52.

To restrain the packing sleeve 46 from being forced out of the cavity, a split bearing 55 is fitted into the casing 45 so as to abut the packing sleeve 46 and engage the ball 47 near the shank 56. On top of the bearing 55 there is disposed a split ring 57 having sufficient thickness to project a short distance beyond the casing 45. Disposed on top of this split ring 57 is a leaf spring 58 having a central opening that registers with the opening in the split ring 57. The underside of the leaf spring 58 is recessed to receive the split ring 57 and thereby maintain these central openings in alignment. The ends of the leaf spring 58 are adjustably fastened to the body 43 by means of a pair of screws 59. Consequently, as the screws 59 are threaded into the body 43, the bearing 55 is urged into the casing 45, forcing the ball 47 into firm engagement with the bearing 48 seated on the cylinder 44, and also forcing the packing sleeve 46 against the circular flange 51 of the casing 45.

To assemble the joint 40, the casing 45, packing sleeve 46 and bearing 48 are inserted into the cavity in the body 43. The leaf spring 58 is then slipped onto the ball member 41, the central opening in the leaf spring 58 being large enough to pass the ball 47 if the shank 56 is connected to a further line. The ball 47 is then inserted into the packing sleeve 46, after which the split bearing 55 and split ring 57 are slipped into the casing 45. It should be noted that the split ring 57 may be replaced by a collar formed on the inner side of the leaf spring 58, and the split bearing 55 may be replaced by a continuous bearing, if the shank 56 is free during assembly.

To tighten the joint 40, the screws 59 are evenly threaded into the body 43 to tension the leaf spring 58 and thereby snugly engage the ball 47 in the bearings 48, 55. Then, the screws 53 are evenly threaded through the leaf spring arms 52 against the body 43 so as to compress the packing sleeve 46 between the flange 51 and bearing 55 and thereby seal between the mid-portion of the ball 47 and casing 45 and also between the cylinder 44 and the casing 45. Since the latter adjustment of screws 53 tends to move bearing 55 out of the casing 45, it occasionally is necessary to further tighten the screws 59 until the bearing 55 again properly seats against the ball 47. This additional tightening of screws 59 tends to further compress the packing sleeve 46, so it is advantageous to make the initial adjustment of screws 53 on the loose side. By adjusting screws 53 and 59 carefully, it is readily possible to tighten each of the packing sleeve 46 and bearings 48, 55 any desired amount.

The bearings 48, 55 and the packing sleeve 46 of the joint 40 are constructed of any suitable material for the application at hand. The preferred materials are the synthetic resins described previously in connection with the joint 10. As will readily be evident, the joint 40 possesses all of the advantages and features pointed out with respect to the joint 10.

It is to be understood that the exemplary embodiments herein described are illustrative and not restrictive of the invention, the scope of which is defined in the appended claims. All modifications that come within the meaning and range of equivalency of the claims are therefore intended to be included therein.

What is claimed is:

1. A ball and socket pipe joint comprising, a ball member having a ball at one end thereof, a conduit member having a cylinder at one end thereof, said ball member and conduit member being disposed in end-to-end relationship with said ball and said cylinder confronting each other, a first bearing for said ball disposed between the confronting portions of said ball and said cylinder, the outer diameters of said ball, first bearing and cylinder being substantially equal, a packing sleeve disposed around said ball, first bearing and cylinder, a casing disposed around said packing sleeve, a second bearing for said ball disposed in said casing adjacent said ball and opposite said first bearing, said casing having an inwardly projecting flange for restraining said second bearing from moving out of said casing, the end of said packing sleeve adjacent said ball abutting said second bearing, first means for tightening said packing sleeve, said first means comprising a first leaf spring having a central opening for said cylinder and a collar for engaging the end of said packing sleeve adjacent said cylinder, the ends of said first leaf spring being adjustably secured to the end of said casing adjacent said cylinder, whereby said collar urges said packing sleeve against said restrained second bearing, second means for tightening said first and second bearings, said second means comprising a second leaf spring attached at its midportion to said cylinder, the ends of said second leaf spring being adjustably secured to the end of said casing adjacent said cylinder, whereby said cylinder urges said first bearing against said ball, and said ball against said restrained second bearing.

2. A ball and socket pipe joint comprising, a body having a passageway extending through a surface thereof, said body having an annular cavity surrounding said passageway so as to form a conduit cylinder, the length of said cylinder being less than the depth of said cavity, a ball member having a ball at one end thereof, said ball being disposed to confront said cylinder, a first bearing for said ball disposed between said ball and said cylinder, the outer diameters of said ball, first bearing and cylinder being substantially equal, a packing sleeve disposed around said ball, first bearing and cylinder, a casing disposed around said packing sleeve, said casing being disposed in said cavity, the end of said casing adjacent said cylinder having an inwardly projecting circular flange against which said packing sleeve abuts, a second bearing for said ball disposed in said casing adjacent said ball and opposite said first bearing, said second bearing abutting the end of said packing sleeve adjacent said ball, first means for tightening said first and second bearings, said first means comprising a first leaf spring having a central opening for said ball member and arranged to bear against said second bearing, the ends of said first leaf spring being adjustably secured to said body, whereby said first leaf spring urges said second bearing against said ball and said ball against said first bearing disposed on said cylinder, second means for tightening said packing sleeve, said second means comprising outwardly extending leaf spring arms attached to the end of said casing adjacent said ball, said arms being adjustably spaced from said body, whereby said circular flange urges said packing sleeve against said second bearing.

References Cited by the Examiner
UNITED STATES PATENTS

| | | | |
|---|---|---|---|
| 908,414 | 12/08 | Mellin | 285—271 |
| 1,132,123 | 3/15 | Royer et al. | 285—271 |
| 1,345,334 | 6/20 | Stafford | 285—271 |
| 2,158,131 | 5/39 | Laurent | 285—267 |
| 2,557,930 | 6/51 | Bard | 285—267 |

CARL W. TOMLIN, *Primary Examiner.*